(12) United States Patent
Wanami et al.

(10) Patent No.: US 7,178,411 B2
(45) Date of Patent: Feb. 20, 2007

(54) LOAD SENSING SYSTEM FOR SEAT

(75) Inventors: Shingo Wanami, Kariya (JP); Satoshi Goshima, Tokyo (JP); Masami Handa, Tokyo (JP); Hideyuki Karasawa, Tokyo (JP)

(73) Assignees: Denso Corporation, Kariya (JP); Fuji Jukogyo Kabushiki Kaisya, Tokyo (JP)

( * ) Notice: Subject to any disclaimer, the term of this patent is extended or adjusted under 35 U.S.C. 154(b) by 36 days.

(21) Appl. No.: 11/054,613

(22) Filed: Feb. 10, 2005

(65) Prior Publication Data

US 2005/0189151 A1 Sep. 1, 2005

(30) Foreign Application Priority Data

Feb. 13, 2004 (JP) .............................. 2004-036946

(51) Int. Cl.
*G01D 7/00* (2006.01)

(52) U.S. Cl. ................................. 73/862.041
(58) Field of Classification Search ............ 73/862.041
See application file for complete search history.

(56) References Cited

U.S. PATENT DOCUMENTS

| 6,563,429 B2 * | 5/2003 | Sakai et al. .................. 340/667 |
| 6,759,604 B2 | 7/2004 | Ishida et al. |
| 2002/0154020 A1 * | 10/2002 | Sumi et al. .................. 340/667 |

* cited by examiner

*Primary Examiner*—Max Noori
(74) *Attorney, Agent, or Firm*—Posz Law Group, PLC

(57) ABSTRACT

Each front sensor senses a load, which is applied to a front part of a seat, and each rear sensor senses a load, which is applied to a rear part of the seat. A size of an entire load sensing range of each front sensor is smaller than a size of an entire load sensing range of each rear sensor.

12 Claims, 5 Drawing Sheets

LOAD SENSING SYSTEM FOR SEAT

CROSS REFERENCE TO RELATED APPLICATION

This application is based on and incorporates herein by reference Japanese Patent Application No. 2004-36946 filed on Feb. 13, 2004.

BACKGROUND OF THE INVENTION

1. Field of the Invention

The present invention relates to a load sensing system for sensing a load, which is applied to a seat.

2. Description of Related Art

A load sensing system is used to, for example, determine a state of an occupant who is seating on a vehicle seat. Such a load sensing system includes front and rear sensors (see, for example, Japanese Unexamined Patent Publication No. 2003-14528, which corresponds to U.S. Pat. No. 6,759,604). For instance, the front sensors of the load sensing system may include a pair of front sensors, which are arranged in two front corners of the seat. Also, the rear sensors of the load sensing system may include a pair of rear sensors, which are arranged in two rear corners of the seat. Each front sensor senses a load, which is applied to a front part of the seat. Each rear sensor senses a load, which is applied to a rear part of the seat. An occupant sensing electronic control unit (ECU) determines a state of the occupant on the seat based on a result of a sum value computing operation for computing a sum value of the sensed load signals of the front and rear sensors.

Here, an entire load sensing range of each sensor needs to be set to a corresponding range, which is determined based on, for example, a weight of the seat, a flexing of a seat frame at the time of installing the seat frame to the seat and a vehicle body, an weight of the occupant, a vibration generated at the time of driving the vehicle, a dynamic change caused by a steering operation of the vehicle. However, when a size of the entire load sensing range of each sensor is increased, the load sensing accuracy of the sensor is disadvantageously reduced. In other words, an occupant determining performance of the occupant sensing ECU for determining the state of the occupant is disadvantageously deteriorated.

SUMMARY OF THE INVENTION

The present invention addresses the above disadvantage. Thus, it is an objective of the present invention to provide a load sensing system, which shows a relatively high load sensing accuracy.

To achieve the objective of the present invention, there is provided a load sensing system, which includes at least one front sensor and at least one rear sensor. The at least one front sensor senses a load, which is applied to a front part of a seat of a vehicle. The at least one rear sensor senses a load, which is applied to a rear part of the seat. A size of an entire load sensing range of each front sensor is smaller than a size of an entire load sensing range of each rear sensor.

To achieve the objective of the present invention, there is also provided a load sensing system, which includes at least one front sensor and at least one rear sensor. The at least one front sensor senses a load, which is applied to a front part of a seat of a vehicle. The at least one rear sensor senses a load, which is applied to a rear part of the seat. A size of an entire load sensing range of each front sensor is generally the same as a size of an entire load sensing range of each rear sensor. The load sensing range of each front sensor includes a positive load sensing subrange and a negative load sensing subrange. The positive load sensing subrange of each front sensor is for sensing a downward load, which is applied to the front part of the seat in a downward direction. The negative load sensing subrange of each front sensor is for sensing an upward load, which is applied to the front part of the seat in an upward direction. The load sensing range of each rear sensor includes a positive load sensing subrange and a negative load sensing subrange. The positive load sensing subrange of each rear sensor is for sensing a downward load, which is applied to the rear part of the seat in the downward direction. The negative load sensing subrange of each rear sensor is for sensing an upward load, which is applied to the rear part of the seat in the upward direction. A size of the positive load sensing subrange of each front sensor is smaller than a size of the positive load sensing subrange of each rear sensor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

(First Embodiment)

Figure 1:
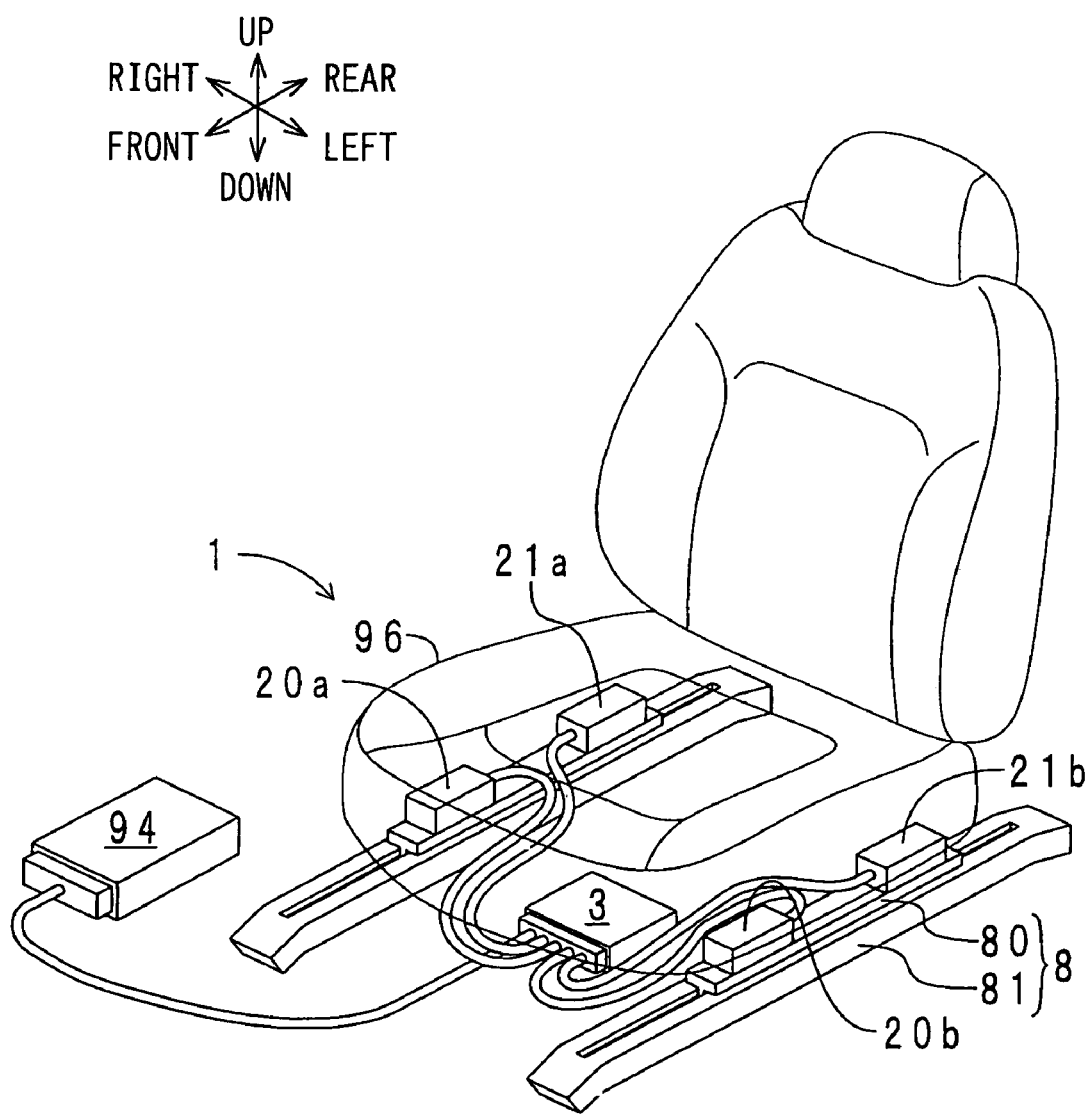
FIG. 1 is a transparent perspective view of a seat, to which a load sensing system according to a first embodiment of the present invention is provided.

A load sensing system according to a first embodiment will be described with reference to FIGS. 1 to 5B. With reference to FIG. 1, in the load sensing system 1, two seat rail parts 8 are arranged parallel to each other in a transverse direction (a width direction) of a vehicle. Each seat rail part 8 includes an upper rail 80 and a lower rail 81. The lower rail 81 is secured to a floor (not shown) of a vehicle body. The upper rail 80 is slidable relative to the lower rail 81 in a fore-and-aft direction (a longitudinal direction) of the vehicle. A seat (a front passenger seat) 96 is slidable integrally with the upper rails 80 in the fore-and-aft direction. Two front sensors 20a, 20b and two rear sensors 21a, 21b are placed in a space between a seat frame (not shown) of the seat 96 and the upper rails 80. The front sensors 20a, 20*b* and the rear sensors 21*a*, 21*b* constitute the load sensing system 1 of the present embodiment. The front sensor 20*a* is vertically opposed to a right front part of a seating surface of the seat 96. In the present embodiment, it should be understood that the left and right are defined with respect to a traveling direction (a running direction) of the vehicle. The front sensor 20*b* is vertically opposed to a left front part of the seating surface of the seat 96. The rear sensor 21*a* is vertically opposed to a right rear part of the seating surface of the seat 96. The rear sensor 21*b* is vertically opposed to a left rear part of the seating surface of the seat 96.

An occupant sensing ECU 3 is arranged between the seat rail parts 8 on a back side of the seat 96. Each of the front sensors 20*a*, 20*b* and the rear sensors 21*a*, 21*b* is connected to the occupant sensing ECU 3 through a corresponding wire harness.

An air bag ECU 94 of an air bag apparatus is placed below an instrument panel (not shown) of the vehicle. The occupant sensing ECU 3 and the air bag ECU 94 are connected to each other through a corresponding wire harness.

Figure 2:
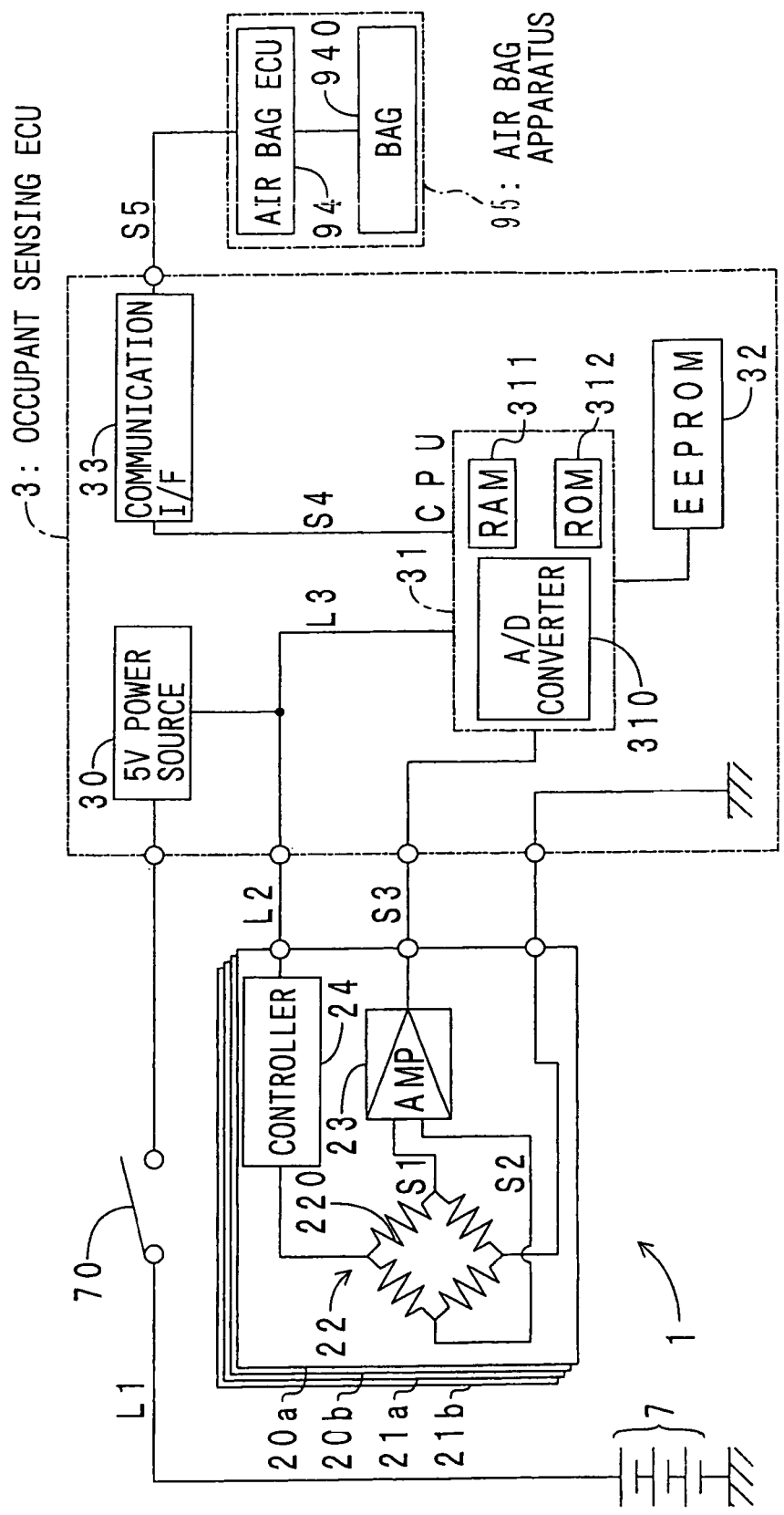
FIG. 2 is a block diagram showing the load sensing system and an occupant sensing ECU.

Next, a detailed structure of the load sensing system 1 of the present embodiment will be described. As schematically shown in FIG. 2, the front sensor 20*a* includes a gauge section 22, an amplifier 23 and a controller 24. The gauge section 22 includes four strain gauges 220, which form a bridge circuit. The amplifier 23 amplifies voltage data (voltage signals) outputted from the gauge section 22. The controller 24 adjusts a slope and an intercept of the voltage data. Upon the adjustment, the amplifier 23 can achieve desired linear output characteristics. Each of the other front sensor 20*b* and the rear sensors 21*a*, 21*b* has a structure, which is similar to that of the front sensor 20*a*. Therefore, description of the structure of each of the other front sensor 20*b* and the rear sensors 21*a*, 21*b* will not be described further for the sake of simplicity.

The occupant sensing ECU 3 includes a 5V power source 30, a central processing unit (CPU) 31, an EEPROM 32 and a communication interface (I/F) 33. The 5V power source 30, which provides the electric power of 5 volts, is connected to a vehicle battery 7 through an ignition switch 70. The CPU 31 includes an A/D converter 310, a RAM 311 and a ROM 312. The A/D converter 310 converts analog voltage data, which is supplied from the amplifier 23, into corresponding digital voltage data. The RAM 311 temporarily stores the converted digital data. A program (not shown) for performing an occupant sensing operation is previously stored in the ROM 312. The EEPROM 32 stores, for example, malfunction information of the front sensors 20*a*, 20*b* and the rear sensors 21*a*, 21*b* at the time of occurrence of malfunctioning of the front sensors 20*a*, 20*b* and the rear sensors 21*a*, 21*b*. The EEPROM 32 is capable of electrically erasing and rewriting its memory. The communication I/F 33 transmits a result of the occupant sensing operation of the CPU 31 to the air bag ECU 94 of the air bag apparatus 95.

Next, a power supply system of the load sensing system of the present embodiment will be described. When the ignition switch 70 is turned on, the electric power of 12 volts is supplied from the vehicle battery 7 to the 5V power source 30 through a power supply line L1. The 5V power source 30 converts the 12 volt electric power to the 5 volt electric power. After the conversion, the 5 volt electric power is supplied from the 5V power source 30 to the front sensors 20*a*, 20*b* and the rear sensors 21*a*, 21*b* through a power supply line L2. Also, the 5 volt electric power is supplied from the 5V power source 30 to the CPU 31 through a power source line L3.

Next, a signaling system of the load sensing system of the present embodiment will be described. The load, which is applied to the seat 96, is sensed through the front sensors 20*a*, 20*b* and the rear sensors 21*a*, 21*b*. As an exemplary case, the front sensor 20*a* will be described. A predetermined voltage is applied to the four strain gauges 220. When the load is applied from the right front part of the seat 96 to the front sensor 20*a*, the resistances of the four strain gauges 220, which constitute the bridge circuit, change. Thus, the balance of the bridge circuit changes, and therefore a small voltage is generated in the gauge section 22. The voltage data, which indicates the small voltage, is transmitted from the gauge section 22 to the amplifier 23 through signal lines S1, S2. The amplifier 23 amplifies the voltage data, which is supplied from the gauge section 22. The amplified analog voltage data is then transmitted to the A/D converter 310 of the CPU 31 through a signal line S3. The A/D converter 310 converts the analog voltage data to the corresponding digital data. The analog data is also supplied from each of the other front sensor 20*b* and the rear sensors 21*a*, 21*b* to the A/D converter 310 and is converted to the corresponding digital data in the A/D converter 310. Each digital data is temporarily stored in the RAM 311. The digital data originated from each of the four sensors 20*a*, 20*b*, 21*a*, 21*b* is retrieved from the RAM 311 and is summed through a summing operation in the CPU 31. The sum value of the digital data after the summing operation is compared with a corresponding threshold value, which is previously stored in the ROM 312, to determine the state of the occupant in the CPU 31. Specifically, in the CPU 31, when the sum value is equal to or less than a seat empty state determination threshold value h1, it is determined that the seat 96 is empty. In contrast, when the sum value is greater than the seat empty state determination threshold value th1 but is equal to or less than an adult/child determination threshold value th2 (>th1), it is determined that the occupant is a child. Furthermore, when the sum value is greater than the adult/child determination threshold value th2, it is determined that the occupant is an adult.

The result of the determination is transmitted from the CPU 31 to the air bag ECU 94 through a signal line S4, the communication I/F 33 and a signal line S5. The air bag ECU 94 outputs a command signal based on the result of the determination. Specifically, in the case where the seat is empty or the occupant is the child, deployment of a bag 940 is prohibited. In contrast, in the case where the occupant is the adult, the deployment of the bag 940 is allowed.

Figure 3:
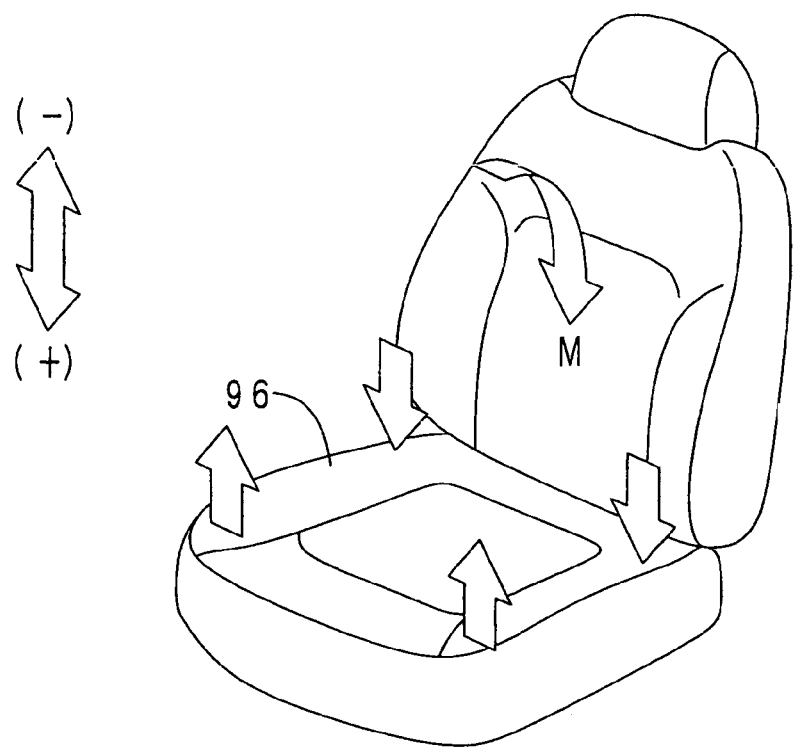
FIG. 3 is a perspective view of the seat, to which the load sensing system is provided.
Figure 4:
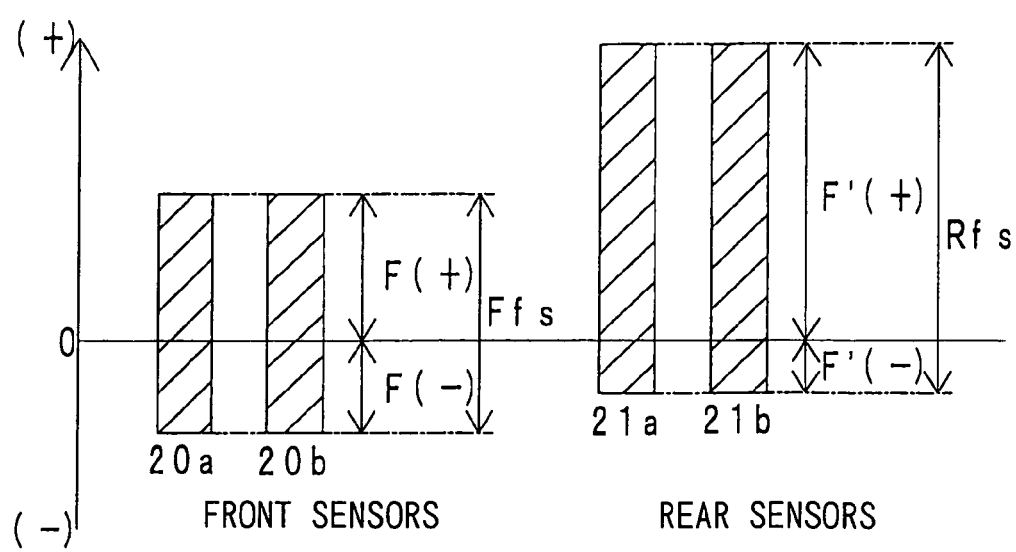
FIG. 4 is a schematic diagram showing a load sensing range of each corresponding sensor of the load sensing system.

Next, the load sensing ranges of the load sensing system of the present embodiment will be described. FIG. 3 shows the seat 96, in which the load sensing system of the present embodiment is arranged. FIG. 4 is a diagram schematically showing the load sensing range of each sensor of the load sensing system. In FIG. 4, the point of 0 is the 0 (zero) point where no load is applied to each corresponding sensor.

When the occupant (not shown) is seated on the seat 96, lower sides of the knees of the occupant are placed on the front part of the seat 96. Furthermore, the soles of the occupant are supported by the floor of the vehicle body. Therefore, a change in the load, which is applied to the front part of the seat 96, is relatively small. In contrast, for example, the buttocks of the occupant are placed on the rear part of the seat 96. Furthermore, the weight of the upper half body above the hip of the occupant is also applied to the rear part of the seat 96. Also, in many cases, the seat is configured to hold the occupant by a seat back of the seat to stably hold the occupant at the time of the traveling of the vehicle. Therefore, a change in the load, which is applied to the rear part of the seat 96, is relatively large. Due to the above facts, the size of the entire load sensing range Ffs of each front sensor 20a, 20b is set to be smaller than the size of the entire load sensing range Rfs of each rear sensor 21a, 21b.

Furthermore, at the time of seating of the occupant onto the seat 96 or at the time of accelerating of the vehicle, a momentum M is applied to the seat 96 in such a manner that the seat back serves as a point of application. Therefore, an upward load acting in an upward direction (a minus direction, i.e., a negative direction) is likely applied to the front part of the seat 96. In contrast, a downward load acting in a downward direction (a plus direction, i.e., a positive direction) is likely applied to the rear part of the seat 96. Due to the above facts, a size of a positive load sensing subrange F(+) of each front sensor 20a, 20b is set to be smaller than a size of a positive load sensing subrange F'(+) of each rear sensor 21a, 21b. Furthermore, a size of a negative load sensing subrange F'(−) of each rear sensor 21a, 21b is set to be smaller than a size of a negative load sensing subrange F(−) of each front sensor 20a, 20b.

Figure 5A:
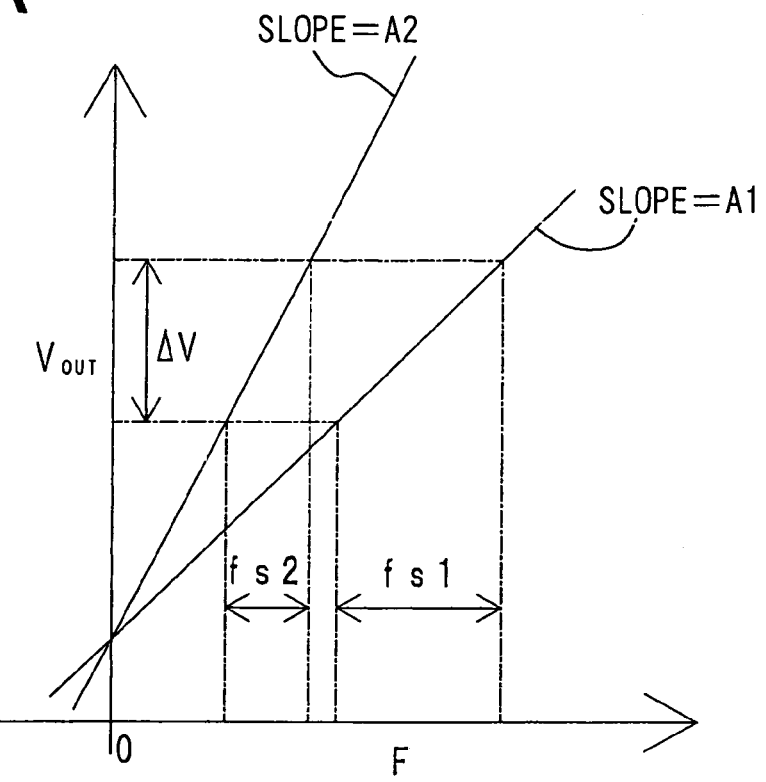
FIG. 5A is a schematic diagram showing a way of changing an entire load sensing range of each corresponding sensor of the load sensing system.
Figure 5B:
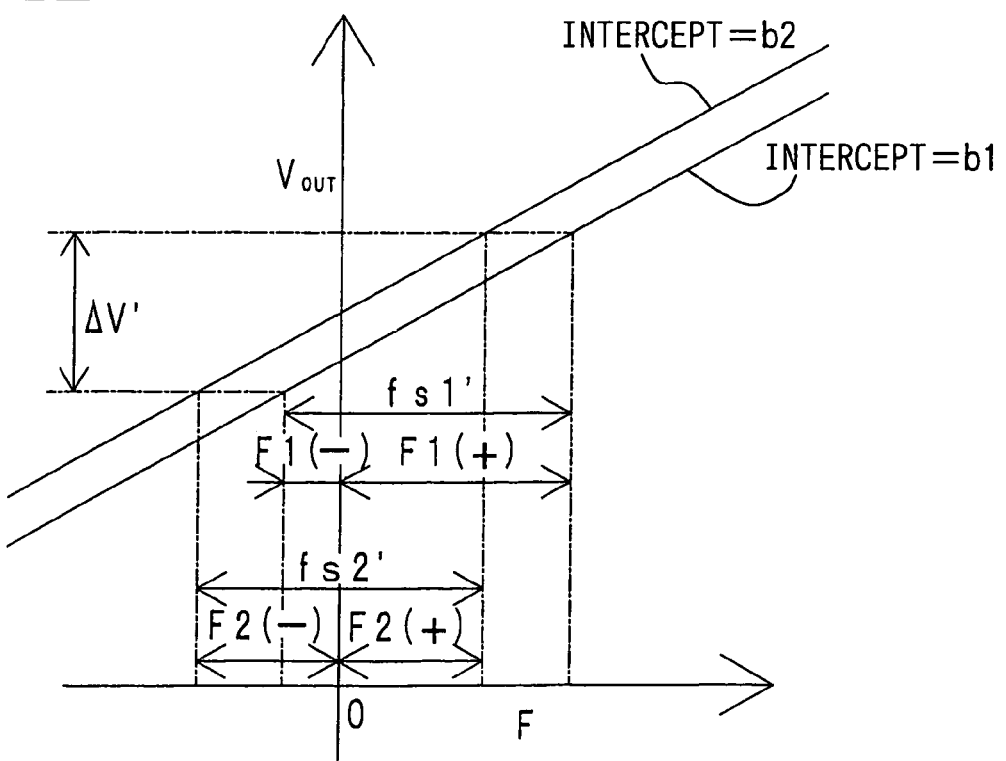
FIG. 5B is a schematic diagram showing a way of changing positive and negative load sensing subranges of each corresponding sensor of the load sensing system.

Next, a way of changing each load sensing range of the load sensing system of the present embodiment will be described. FIGS. 5A and 5B show a schematic diagram indicating the way of changing each load sensing range (including the subranges) of the load sensing system of the present embodiment. The change of the load sensing range is performed in the amplifier 23 of each of the front sensors 20a, 20b and the rear sensors 21a, 21b.

First, the way of changing the size of the entire load sensing range will be described. As shown in FIG. 5A, the voltage $V_{OUT}$, which is sensed buy the gauge section 22 through the signal lines S1, S2, is proportional to the measured load F. For example, in the case of the sensed voltage range ΔV, when the slope of the proportional straight line is set to be A1, the range of the measured load F, i.e., the load sensing range becomes fs1. In contrast, when the slope of the proportional straight line is set to be A2 (>A1), the load sensing range becomes fs2. In this case, the size (width) of the entire load sensing range fs2 is smaller than the size (width) of the entire load sensing range fs1. As described above, through adjustment of the slope of the proportional straight line, the amplifier 23 changes the size of the entire load sensing range.

Secondary, a way of changing each of the positive load sensing subrange and the negative load sensing subrange will be described. As shown in FIG. 5B, in the case of the sensed voltage range ΔV', when the intercept of the proportional straight line is set to be b1, the load sensing range becomes fs1'. In contrast, when the intercept of the proportional straight line is set to be b2 (>b1), the load sensing range becomes fs2'. In this case, the size (width) of the entire load sensing range fs1' is generally the same as the size (width) of the entire load sensing range fs2'. However, the entire load sensing range fs2' is shifted in the negative side in comparison to the entire load sensing range fs1'. More specifically, the negative load sensing subrange F2(−) of the load sensing range fs2' is larger than the negative load sensing subrange F1(−) of the load sensing range fs1'. In contrast, the size of the positive load sensing subrange F2(+) of the load sensing range fs2' is smaller than the size of the positive load sensing subrange F1(+) of the load sensing range fs1'. As described above, through the adjustment of the intercept of the proportional straight line, the amplifier 23 changes the positive load sensing subrange and the negative load sensing subrange.

Advantages of the load sensing system 1 of the present embodiment will be described. In the load sensing system 1, the load sensing range of each front sensor 20a, 20b is set to be Ffs, and the load sensing range of each rear sensor 21a, 21b is set to be Rfs. More specifically, the entire load sensing range of each sensor is minimized. Therefore, the load sensing accuracy of the load sensing system 1 of the present embodiment is relatively high.

Furthermore, the size of the entire load sensing range Ffs of each front sensor 20a, 20b is set to be smaller than the size of the entire load sensing range Rfs of each rear sensor 21a, 21b. Therefore, the load sensing accuracy of each front sensor 20a, 20b is particularly high.

Also, in the load sensing system 1 of the present embodiment, the size of the positive load sensing subrange F(+) of each front sensor 20a, 20b is set to be smaller than the size of the positive load sensing subrange F'(+) of each rear sensor 21a, 21b. Therefore, the load sensing accuracy of each front sensor 20a, 20b with respect to the downward load is relatively high. Furthermore, each rear sensor 21a, 21b has the required minimum load sensing subrange for the downward load.

In the load sensing system 1 of the present embodiment, the size of the negative load sensing subrange F'(−) of each rear sensor 21a, 21b is set to be smaller than the size of the negative load sensing subrange F(−) of each front sensor 20a, 20b. Furthermore, each front sensor 20a, 20b has the required minimum load sensing subrange for the upward load.

(Second Embodiment)

A second embodiment is similar to the first embodiment except that the size of the entire load sensing range of each front sensor and the size of the entire load sensing range of each rear sensor are generally the same. Thus, the following description will be mainly focused on this difference.

Figure 6:
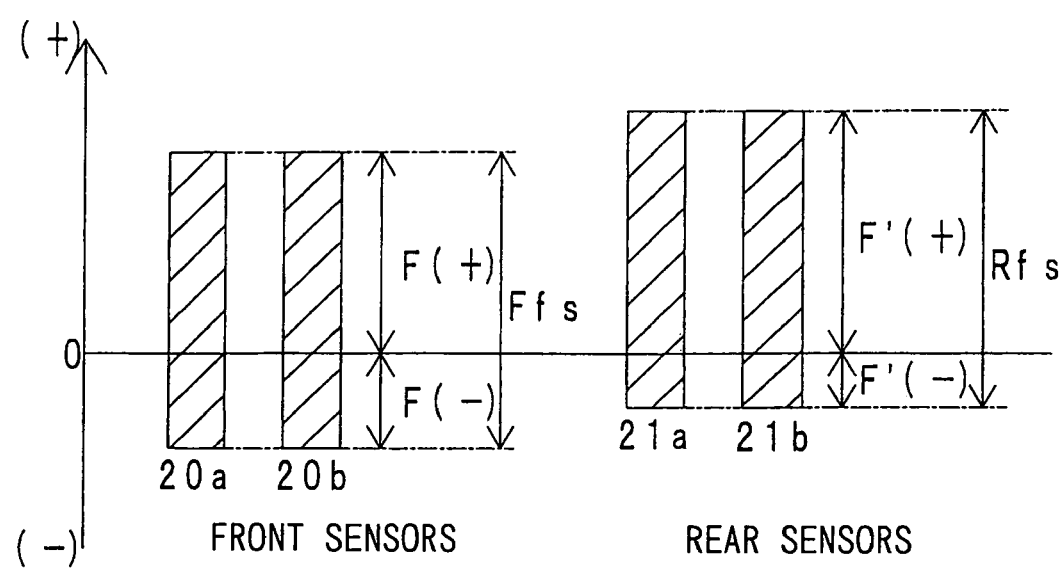
FIG. 6 is a schematic diagram showing a load sensing range of each corresponding sensor of a load sensing system according to a second embodiment of the present invention.

FIG. 6 is a schematic diagram showing the load sensing range of each sensor of the load sensing system of the present embodiment. The components similar to those of FIG. 4 will be indicated by the same numerals. As shown in FIG. 6, the size of the entire load sensing range Ffs of each front sensor 20a, 20b is set to be generally the same as the size of the entire load sensing range Rfs of each rear sensor 21a, 21b. Furthermore, the size of the positive load sensing subrange F(+) of each front sensor 20a, 20b is set to be smaller than the size of the positive load sensing subrange F'(+) of each rear sensor 21a, 21b. Furthermore, the size of the negative load sensing range F'(−) of each rear sensor 21a, 21b is set to be smaller than the size of the negative load sensing subrange F(−) of each front sensor 20a, 20b. That is, in the above load sensors of the same type, the 0 point, which indicates the no load state, is relatively shifted in the load sensing range.

The load sensing system of the present embodiment provides the advantages similar to those of the first embodiment. Furthermore, in the load sensing system of the present embodiment, the load sensors, which have generally the same size of the entire load sensing range, are used as the front sensors 20a, 20b and the rear sensors 21a, 21b. Thus, the manufacturing costs can be reduced through use of the universal sensors, which can be used as the front and rear sensors 20a, 20b, 21a, 21b. Furthermore, the relatively high load sensing accuracy is achieved in each of the front sensors 20a, 20b and the rear sensors 21a, 21b.

(Modifications)

The embodiments of the present invention are described above. However, the embodiments of the present invention are not limited to the above described ones. Therefore, modifications of the above embodiments, which are conceivable by the person skilled in the art, can be made without departing the scope of the invention.

For instance, in the above embodiments, the pair of front sensors 20a, 20b and the pair of rear sensors 21a, 21b are provided. However, the number of the front sensors 20a, 20b and the number of the rear sensors 21a, 21b are not limited to the above ones. For example, in place of the pair of front sensors 20a, 20b and the pair of rear sensors 21a, 21b, it is possible to provide a single front sensor and a single rear sensor. Furthermore, in the above embodiments, the size of the entire load sensing range, the size of the positive load sensing subrange and the size of the negative load sensing subrange are changed in the amplifier 23 of each corresponding sensor. Alternatively, the size of the entire load sensing range, the size of the positive load sensing subrange and the size of the negative load sensing subrange can be changed in, for example, a strain generating part or the gauge section 22 of the load sensor, the occupant sensing ECU 3 or an externally connected dedicated device.

Additional advantages and modifications will readily occur to those skilled in the art. The invention in its broader terms is therefore not limited to the specific details, representative apparatus, and illustrative examples shown and described.

What is claimed is:

1. A load sensing system comprising:
at least one front sensor that senses a load, which is applied to a front part of a seat of a vehicle; and
at least one rear sensor that senses a load, which is applied to a rear part of the seat, wherein a size of an entire load sensing range of each front sensor is smaller than a size of an entire load sensing range of each rear sensors,
wherein the load sensing range of each front sensor includes:
a positive load sensing subrange for sensing a downward load, which is applied to the front part of the seat in a downward direction; and
a negative load sensing subrange for sensing an upward load, which is applied to the front part of the seat in an upward direction;
the load sensing range of each rear sensor includes:
a positive load sensing subrange for sensing a downward load, which is applied to the rear part of the seat in the downward direction; and
a negative load sensing subrange for sensing an upward load, which is applied to the rear part of the seat in the upward direction; and
a size of the positive load sensing subrange of each front sensor is smaller than a size of the positive load sensing subrange of each rear sensor.

2. A load sensing system comprising:
at least one front sensor that senses a load, which is applied to a front part of a seat of a vehicle; and
at least one rear sensor that senses a load, which is applied to a rear part of the seat, wherein a size of an entire load sensing range of each front sensor is smaller than a size of an entire load sensing range of each rear sensor,
wherein the load sensing range of each front sensor includes:
a positive load sensing subrange for sensing a downward load, which is applied to the front part of the seat in a downward direction; and
a negative load sensing subrange for sensing an upward load, which is applied to the front part of the seat in an upward direction;
the load sensing range of each rear sensor includes:
a positive load sensing subrange for sensing a downward load, which is applied to the rear part of the seat in the downward direction; and
a negative load sensing subrange for sensing an upward load, which is applied to the rear part of the seat in the upward direction; and
a size of the negative load sensing subrange of each rear sensor is smaller than a size of the negative load sensing subrange of each front sensor.

3. A load sensing system comprising:
at least one front sensor that senses a load, which is applied to a front part of a seat of a vehicle; and
at least one rear sensor that senses a load, which is applied to a rear part of the seat, wherein:
a size of an entire load sensing range of each front sensor is generally the same as a size of an entire load sensing range of each rear sensor;
the load sensing range of each front sensor includes:
a positive load sensing subrange for sensing a downward load, which is applied to the front part of the seat in a downward direction; and
a negative load sensing subrange for sensing an upward load, which is applied to the front part of the seat in an upward direction;
the load sensing range of each rear sensor includes:
a positive load sensing subrange for sensing a downward load, which is applied to the rear part of the seat in the downward direction; and
a negative load sensing subrange for sensing an upward load, which is applied to the rear part of the seat in the upward direction; and
a size of the positive load sensing subrange of each front sensor is smaller than a size of the positive load sensing subrange of each rear sensor.

4. The load sensing system of claim 1, wherein at least one of the at least one front sensor and the at least one rear sensor changes the load sensing range thereof proportional to the load.

5. The load sensing system of claim 1, wherein at least one of the at least one front sensor and the at least one rear sensor changes at least one of the positive load sensing subrange and the negative load sensing subrange thereof proportional to the load.

6. The load sensing system of claim 1, wherein at least one of the positive load sensing subranges and the negative load sensing subranges is adjustable.

7. The load sensing system of claim 2, wherein at least one of the at least one front sensor and the at least one rear sensor changes the load sensing range thereof proportional to the load.

8. The load sensing system of claim 2, wherein at least one of the at least one front sensor and the at least one rear sensor changes at least one of the positive load sensing subrange and the negative load sensing subrange thereof proportional to the load.

9. The load sensing system of claim 2, wherein at least one of the positive load sensing subranges and the negative load sensing subranges is adjustable.

10. The load sensing system of claim 3, wherein at least one of the at least one front sensor and the at least one rear sensor changes the load sensing range thereof proportional to the load.

11. The load sensing system of claim 3, wherein at least one of the at least one front sensor and the at least one rear sensor changes at least one of the positive load sensing subrange and the negative load sensing subrange thereof proportional to the load.

12. The load sensing system of claim 3, wherein at least one of the positive load sensing subranges and the negative load sensing subranges is adjustable.

* * * * *